United States Patent
Boneberg et al.

(10) Patent No.: US 7,135,049 B2
(45) Date of Patent: Nov. 14, 2006

(54) METHOD FOR OPERATING A GAS GENERATION DEVICE IN A FUEL CELL SYSTEM

(75) Inventors: Stefan Boneberg, Beuren (DE); Martin Schuessler, Ulm (DE); Hans-Frieder Walz, Bad Ueberkingen (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 812 days.

(21) Appl. No.: 09/863,872

(22) Filed: May 24, 2001

(65) Prior Publication Data

US 2002/0011028 A1 Jan. 31, 2002

(30) Foreign Application Priority Data

May 24, 2000 (DE) ................ 100 25 667

(51) Int. Cl.
*B01J 8/04* (2006.01)
*B01J 19/00* (2006.01)

(52) U.S. Cl. .................. 48/127.9; 48/61; 422/198

(58) Field of Classification Search ............... 48/127.9, 48/61; 422/198, 169, 173; 423/350
See application file for complete search history.

(56) References Cited

U.S. PATENT DOCUMENTS 5,733,347 A 3/1998 Lesieur 5,928,614 A 7/1999 Autenrieth
6,187,066 B1 * 2/2001 Benz et al. ................ 48/127.9

FOREIGN PATENT DOCUMENTS

| DE | 33 45 958 A1 | 12/1983 |
|---|---|---|
| EP | 0 968 958 A1 | 1/2000 |
| EP | 0968958 | 1/2000 |
| WO | WO 96/00186 | 1/1996 |

OTHER PUBLICATIONS

Copy of the Search Report.

* cited by examiner

*Primary Examiner*—Glenn Caldarola
*Assistant Examiner*—Tom P. Duong
(74) *Attorney, Agent, or Firm*—Crowell & Moring LLP

(57) ABSTRACT

A method for operating a gas generation device, for example, for a fuel cell system, having at least two gas generation units through which a starting-material stream flows in series. The two gas generating units have a first and second rated power $P_{rated\_1}$, $P_{rated\_2}$ and a first and second predetermined operating temperature $T_{rated\_1}$, $T_{rated\_2}$, and the first gas generation unit has a lower thermal mass than the second gas generation unit. During a starting phase only the first gas generation unit is operated, with a power $P_{start\_1} > P_{rated\_1}$. After the end of the starting phase at least the second gas generation unit is operated.

13 Claims, 2 Drawing Sheets

METHOD FOR OPERATING A GAS GENERATION DEVICE IN A FUEL CELL SYSTEM

BACKGROUND AND SUMMARY OF THE INVENTION

This application claims the priority of German patent document 100 25 667.8, filed May 24, 2000, the disclosure of which is expressly incorporated by reference herein.

The invention relates to a method for operating a gas generation device in a fuel cell system.

Gas generation devices for generating hydrogen are started in various ways. For example, in International patent document WO 96/00186 A1 autothermal or partial oxidation reactors are started by means of an exothermic reaction in the interior of the reactors.

Moreover, reactors for steam reforming which are heated by means of an exothermic reaction in a thermally coupled region and/or by the introduction of a hot heat-transfer gas are also known (See, for example, German patent document DE 33 45 958 A1).

However, reactors of this type have a high thermal mass, and therefore need a very long time to be heated to a predetermined operating temperature. To avoid this drawback, a multistage reformer which has at least one subunit with a reduced thermal mass (compared to the other subunits) is known from European patent document EP 0 968 958 A1.

It is an object of the present invention to provide an improved method for operating a gas generation device in a fuel cell system, in particular with improved cold-start properties.

This and other objects and advantages are achieved by the method according to the invention, in which at least two gas generation units, through which a starting-material stream flows in sequence, are provided in a gas generation device, with the first gas generation unit having a lower thermal mass than the second gas generation unit. During a starting phase, only the first gas generation unit is operated, with a power and/or at a temperature which lie above the values encountered in normal operation of the gas generation device. After the end of the starting phase, at least the second gas generation unit is then operated.

Therefore, for the cold start, only a subunit of the overall gas generation device is used. This means the hydrogen immediately after the start is generated in a thermally separate unit, while the remaining hydrogen-generating region is still cold. This drastically reduces the mass which has to be heated.

As a result of the low thermal mass and the overload operation of the first gas generation unit during the starting phase, the cold-start time of the gas generation device is shortened. Particularly in mobile applications in the automotive sector, cold start must take place very quickly. Moreover, the reduced thermal mass reduces the quantity of oxygen required during the starting phase in catalytically heated systems.

The possibility of using the first gas generation unit (after the starting phase) only in full-load operation enhances the service life of the first gas generation unit, which is limited as a result of overload operation during the starting phase. Because this unit is switched off (or running a reduced load) in partial load phases, it is possible overall to provide a fuel cell system of sufficient service life.

The possibility of the first gas generation unit also operating in the partial load range in the event of substantial load changes has the advantage that a sufficient quantity of hydrogen can be provided within a short time, so that it is possible to improve the dynamics of the system. Moreover, the low thermal mass of the first gas generation unit makes it possible to keep this unit warm by suitable means where necessary (i.e., to keep it at a temperature which lies between ambient temperature and operating temperature). In this way, the cold-start time can be shortened further.

Other objects, advantages and novel features of the present invention will become apparent from the following detailed description of the invention when considered in conjunction with the accompanying drawings.

DETAILED DESCRIPTION OF THE DRAWINGS

Figure 1A:
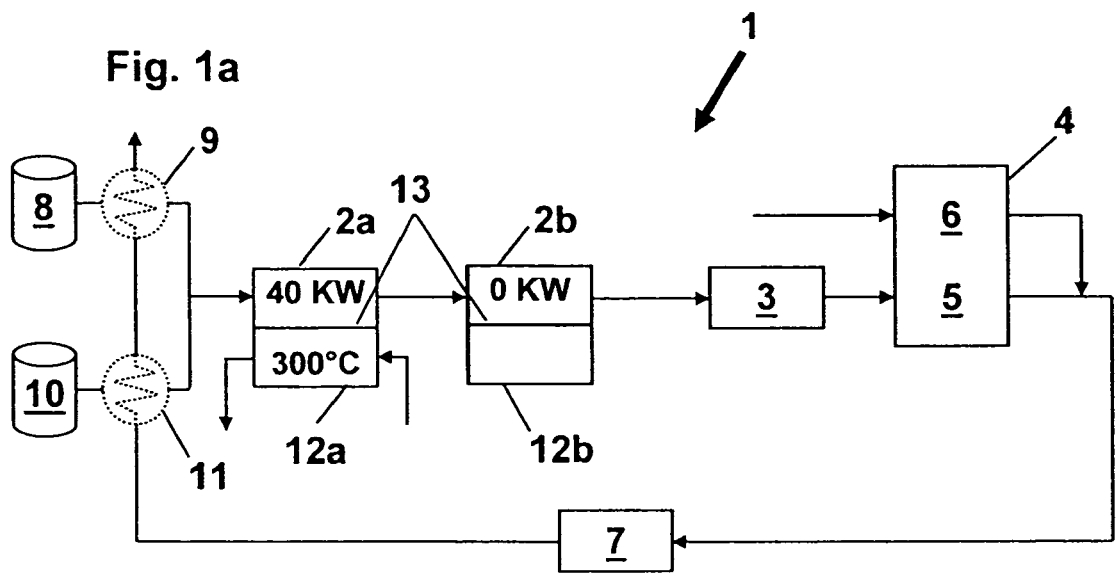
FIG. 1a shows a simplified block diagram of a first exemplary embodiment of a fuel cell system during the starting phase.
Figure 1B:
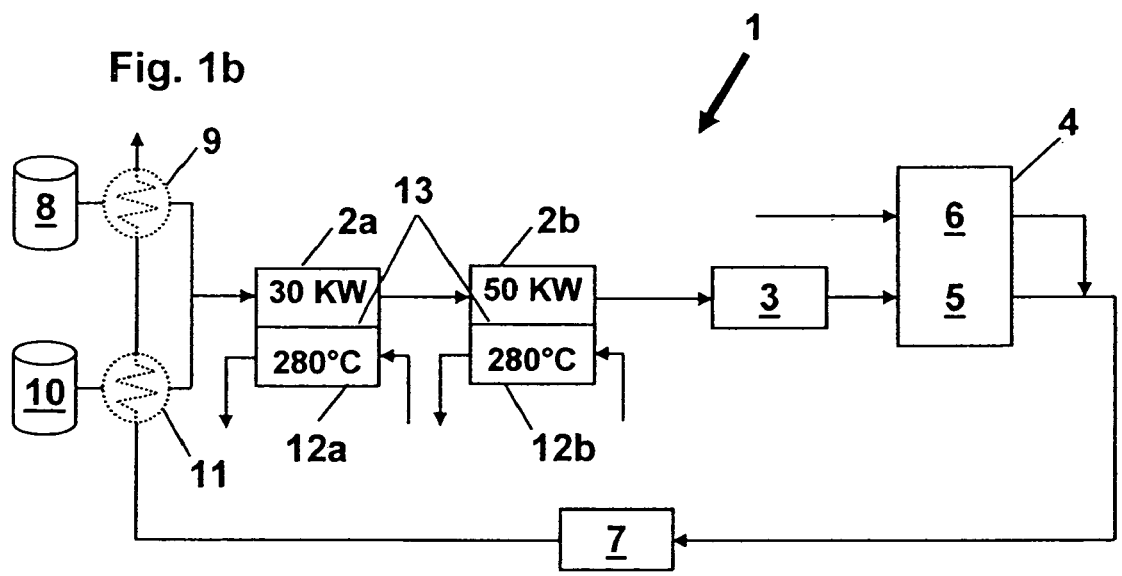
FIG. 1b shows the fuel cell system in accordance with FIG. 1a during normal operation.

The fuel cell system shown in FIGS. 1a, 1b has a two-stage gas generation unit 2a, 2b, a gas cleaning unit 3, a fuel cell 4 with an anode space 5 and a cathode space 6, and an exhaust treatment unit 7. In the gas generation unit 2a, 2b, a hydrogen-rich gas is generated from a fuel by means of steam reforming. Since the steam reforming is endothermic (it must be supplied with energy), suitable temperature-control spaces 12a, 12b are provided in both gas generation units 2a, 2b. The temperature-control spaces 12a, 12b are connected, via thermally conductive partitions 13, to the actual reaction spaces of the corresponding gas generation units 2a, 2b. A suitable heat-transfer medium (for example a heat-transfer oil) may flow through the temperature-control spaces 12a, 12b. Alternatively, it is also possible to provide suitable burner units in the temperature-control spaces 12a, 12b. These are preferably catalytic burner units, in which combustible constituents of a gas flowing through the temperature-control spaces 12a, 12b are oxidized by means of an oxygen-containing medium. In the exemplary embodiment, medium flows through each of the temperature-control spaces 12a, 12b independently and in countercurrent to the fuel gas. However, it is also possible for the flow through at least one of the two temperature-control spaces 12a, 12b to be in co-current. Moreover, it is also possible for medium to flow through the two temperature-control spaces 12a, 12b successively.

This hydrogen-rich gas usually also contains carbon monoxide, which has a damaging effect on the catalysts which are present in the anode space 5 of the fuel cell 4. For this reason, a gas cleaning unit 3 is provided between the gas generation unit 2 and the anode space 5 of the fuel cell 4. This gas cleaning unit is preferably a device for the selective catalytic oxidation of the carbon monoxide by the addition of oxygen. However, it is also possible to use other suitable gas cleaning units 3, for example a membrane cleaning unit. If a device for the selective catalytic oxidation of the carbon monoxide is used, it can also be integrated as a burner, for supplying the thermal energy required, directly in one or both temperature-control spaces 12a, 12b of the gas generation units 2a, 2b.

After flowing through the fuel cell 4, the anode exhaust gas is mixed with the outgoing air from the cathode space 6 and is fed to the exhaust treatment unit 7, where all the combustible constituents of the fuel cell exhaust gases are converted as completely as possible at a suitable catalyst, preferably a precious-metal catalyst. Instead of the cathode exhaust gas, it is also possible for another oxygen-containing gas to be admixed with the anode exhaust gas upstream of the exhaust treatment unit 7.

The fuel is fed out of a fuel tank 8 into the gas generation unit 2. Liquid fuels are preferably carried in the fuel tank 8. Alternatively, however, it is also possible to use gaseous fuels, in which case the fuel tank 8 is designed as a compressed-gas or liquefied-gas store. When using a liquid fuel, an evaporator unit 9 is usually also provided, which converts the liquid fuel into the gaseous phase before it enters the gas generation unit 2a, 2b. Furthermore, a water tank 10 is provided. The water is evaporated in a separate evaporator unit 11, and the steam is then admixed with the gaseous fuel before it enters the gas generation unit 2a, 2b. Alternatively, it is also possible to mix liquid fuel and water and then for these constituents to be evaporated in a single, common evaporator unit.

In the exemplary embodiment shown, the evaporator units 9, 11 are heated by the hot exhaust gases from the exhaust treatment unit 7. Alternatively, however, it is also possible for the evaporator units 9, 11 to be heated by another heat-transfer medium. It is also possible for the exhaust treatment unit 7 to be completely or partially integrated in the evaporator units 9, Operation of the illustrated fuel cell system 1 is explained below with reference to an exemplary embodiment, FIG. 1a showing operation during a starting phase and FIG. 1b showing normal operation (after the starting phase has ended). In the example shown, the gas generation units 2a, 2b have a total rated power $P_{rated\_ges}=P_{rated\_1}+P_{rated\_2}$ of 80 KW. This means that during prolonged operation at full load, the gas generation units 2a, 2b can produce the amount of hydrogen necessary for fuel cell 4 to generate 80 KW of electric power. In normal operation as shown in FIG. 1b, the first gas generation unit 2a contributes a rated power $P_{rated\_1}=30$ KW, while the second gas generation unit 2b contributes the remaining rated power $P_{rated\_2}=50$ KW. If, in dynamic operation, the fuel cell system 1 is to provide less electric power, correspondingly less operating medium is fed to the gas generation units 2a, 2b, so that correspondingly less hydrogen is also generated. In normal operation, the two gas generation units 2a, 2b are held at predetermined operating temperatures $T_{rated\_1}$, $T_{rated\_2}$, for example $T_{rated\_1}=T_{rated\_2}=280°$ C.

According to the invention, the two gas generation units 2a, 2b are designed so that the first gas generation unit 2a has a lower thermal mass than the second gas generation unit 2b. At the same time, during the starting phase only the first gas generation unit 2a is operated. Since this unit has a lower thermal mass, it can be brought up to a required operating temperature more quickly in the event of a starting operation. This can take place in various ways, either directly by means of a catalytic reaction in the gas generation unit 2a or by means of indirect heating using a burner, heat-transfer medium or electric heating. Alternatively, however, the first gas generation unit 2a may also be held at a minimum temperature during operating pauses, which is also simplified by the lower thermal mass.

A further aspect of the invention consists in the fact that the first gas generation unit 2a, during the starting phase, is operated with a power $P_{start\_1}>P_{rated\_1}$ and/or at an operating temperature $T_{start\_1}>T_{rated\_1}$. As a result of the elevated operating temperature $T_{start\_1}$, for example $T_{start\_1}=300°$ C., the downstream components, through which the hot product gas stream from the first gas generation unit 2a flows, in particular the second gas generation unit 2b, are heated more rapidly. At the same time, the first gas generation unit 2a can be operated in overload, for example at $P_{start\_1}=40$ KW, as a result of the elevated operating temperature $T_{start\_1}$. Although, therefore, during the starting phase only the first gas generation unit 2a is operated, it is nevertheless possible to provide a maximum power of 40 KW. Although such operation reduces the service life of the first gas generation unit 2a, on the other hand it is possible in this manner to ensure improved cold-start properties as a result.

Although only the first gas generation unit 2a is operated during the starting phase, the second gas generation unit 2b is not separated from the product gas stream. Rather, the second gas generation unit 2b is switched off in that during the starting phase only the same amount of operating medium as that which can be converted in the first gas generation unit 2a is supplied. Therefore, a substantially completely converted stream of operating medium flows through the second gas generation unit 2b, so that the second gas generation unit 2b makes substantially no contribution ($P_{start\_2}=0$ KW) to the total rated power. No operating temperature $T_{rated\_2}$ is given in FIG. 1a for the second gas generation unit 2b, since it is not generally externally heated and therefore is also not at a defined operating temperature. Rather, the second gas generation unit 2b is simply heated directly by the hot product gas stream from the first gas generation unit 2a, so that a gradually rising temperature is established. However, if sufficient thermal or electrical energy is already available in the fuel cell system 1 during the starting phase, the second gas generation unit 2b can also be directly or indirectly heated even during the starting phase.

Figure 2A:
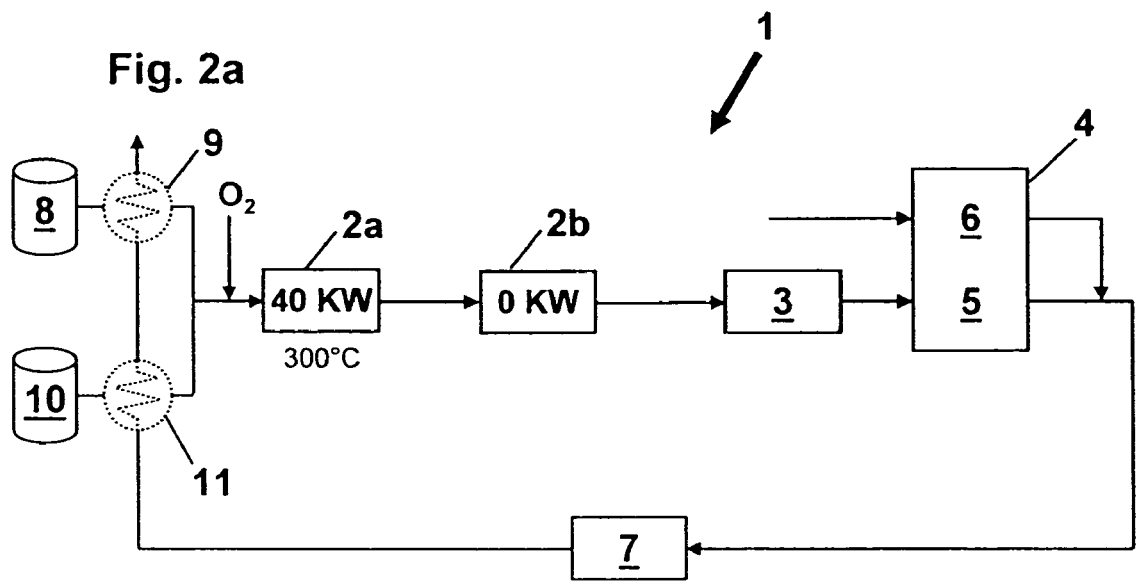
FIG. 2a shows a simplified block diagram of a second exemplary embodiment of a fuel cell system during the starting phase.
Figure 2B:
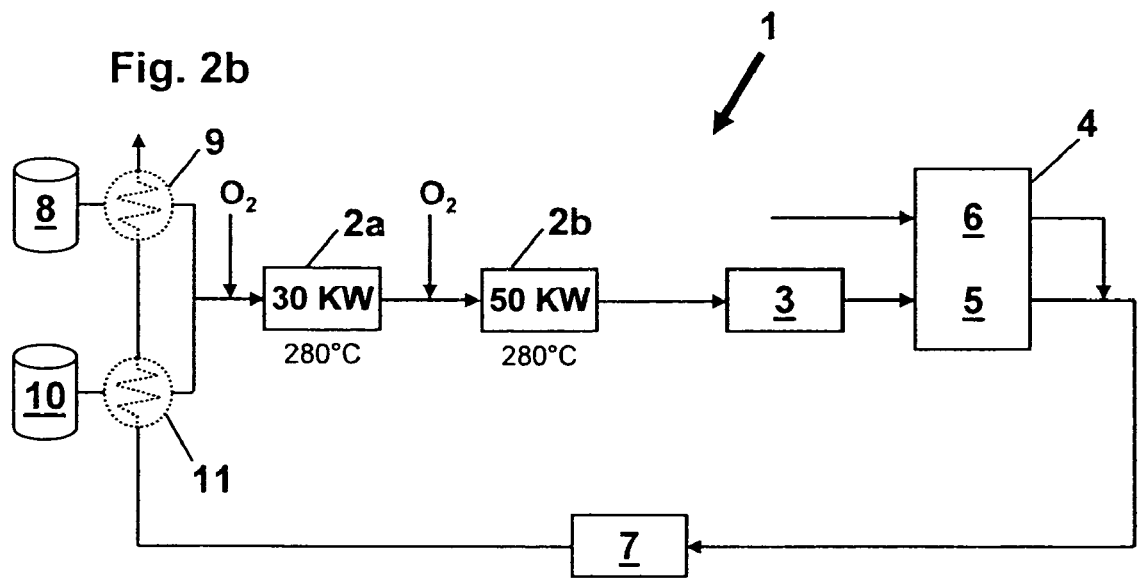
FIG. 2b shows the fuel cell system in accordance with FIG. 2a during normal operation.

FIGS. 2a, 2b show a second exemplary embodiment, FIG. 2a once again showing the starting phase and FIG. 2b the normal operating phase of the fuel cell system, parts which are identical to those shown in FIGS. 1a, 1b being denoted by corresponding reference symbols. Unlike in the first exemplary embodiment, the two gas generation units 2a, 2b are operated in an autothermal operating method which is known per se. This means that the endothermal steam reforming is combined with an exothermic, partial oxidation in such a way that the gas generation units 2a, 2b overall are operated in an autothermal manner. Temperature-control spaces are not provided in this case. An oxygen-containing medium required for the partial oxidation is supplied upstream to the gas generation units 2a, 2b. The quantity of oxygen-containing medium supplied determines the oxidation rate in the gas generation units 2a, 2b and therefore also the respective operating temperature. The oxygen-containing medium used is preferably air. Although the following text only speaks of oxygen, it is, of course, also possible to use any desired oxygen-containing media.

Once again, in the starting phase (FIG. 2a), only the amount of operating medium which can be converted in the first gas generation unit 2a is supplied. At the same time, oxygen is only fed into the first gas generation unit 2a. During the starting phase, the quantity of oxygen is set in such a way that an elevated operating temperature $T_{rated\_1}$32 300° C. is established. As has already been explained above, during the starting phase the first gas generation unit 2a is operated in overload mode, i.e., in the example illustrated, at a rated power $P_{start\_1}=40$ KW. Since the operating medium is substantially completely converted in the first gas generation unit 2a, and also no additional oxygen is added, there will be substantially no conversion in the second gas generation unit 2b, so that this unit once again makes substantially no contribution ($P_{start\_2}$=0 KW) to the total rated power. However, the second gas generation unit 2b is once again heated at least by the hot product gas stream from the first gas generation unit 2a.

After the starting phase has ended, the quantity of oxygen supplied is reduced in such a manner that an operating temperature $T_{rated\_1}$=280° C. which is lower than that reached in the starting phase is established in the first gas generation unit 2a. At the same time, oxygen is also added upstream of the second gas generation unit 2b. The oxygen is added in a quantity which is such that an operating temperature $T_{rated\_2}$=280° C. is also established in the second gas generation unit 2b.

The numerical values mentioned for the rated powers and operating temperatures are simply examples and can, of course, be adapted to the prevailing conditions without departing from the scope of the solution according to the invention. Furthermore, it is possible to use any desired gas generation units 2a, 2b, in particular, in addition to the steam reforming and autothermal operating mode which have already been described, also a partial oxidation stage, in which case the gas generation units may also be combined in a suitable way which differs from that of the exemplary embodiments.

In a preferred embodiment, the first gas generation unit 2a is used only during the starting phase and during operating phases in which there is a load demand which exceeds the rated power $P_{rated\_2}$ of the second gas generation unit 2b. By contrast, in partial load operation substantially the entire power is provided by the second gas generation unit 2b. For this purpose, for example in the partial load range, the supply of oxygen to the first gas generation unit 2a may be reduced or stopped altogether.

In a further exemplary embodiment, the first gas generation unit 2a may also be activated in the event of substantial load changes, in order to provide a sufficient quantity of hydrogen within the shortest possible time. For this purpose, for example in the event of a load change, a predetermined quantity of oxygen is added to the first gas generation unit 2a for a short time.

The use of the first gas generation unit 2a only during the starting phase and, in addition, also in the full-load range and/or in the event of substantial load changes has the advantage that the overall service life of the first gas generation unit 2a is increased again, since the service life, which has been reduced on account of the overload operation during the starting phase, is increased again as a result of the unit being switched off or at least operated at reduced load during the partial load phases. It is therefore possible to create a fuel cell system in which both gas generation units 2a, 2b have a uniform, sufficient service life despite the shortened starting phase.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a gas generation device for a fuel cell system, said gas generation device having at least two gas generation units through which a starting-material stream flows in sequence, and which gas generation units have a first and second rated power $P_{rated\_1}$, $P_{rated\_2}$, and a first and second predetermined operating temperature, respectively, said method comprising:
   providing the first gas generation unit with a lower thermal mass than the second gas generation unit;
   during a starting phase of the gas generation device, operating only the first gas generation unit, with a power $P_{start\_1} > P_{rated\_1}$ or at an operating temperature $T_{start\_1} > T_{rated1}$; and
   after the end of the starting phase, operating at least the second gas generation unit.

2. The method according to claim 1, wherein:
   after the starting phase has ended, in the event of a low and medium load, only the second gas generation unit is operated; and
   the first gas generation unit is operated only when a required power exceeds the rated power $P_{rated\_2}$ of the second gas generation unit.

3. The method according to claim 2, wherein after the end of the starting phase, the first gas generation unit is supplied with oxygen-containing medium only when a required power exceeds the rated power $P_{rated\_2}$ of the second gas generation unit.

4. The method according to claim 1, wherein:
   the gas generation units are indirectly heated endothermic steam reforming units;
   the first gas generation unit is operated during the starting phase at a temperature $T_{start\_1} > T_{rate\_1}$, and is supplied with at most a quantity of operating medium which corresponds to an instantaneously required power; and
   after the end of the starting phase, the gas generation units are operated at predetermined operating temperatures.

5. The method according to claim 4, wherein after the end of the starting phase, the first gas generation unit is supplied with only a quantity of oxygen-containing medium which is reduced compared to the maximum quantity reached during the starting phase.

6. The method according to claim 5, wherein no oxygen containing medium is supplied.

7. The method according to claim 1, wherein:
   during the starting phase, at least the first gas generation unit, is also supplied with an oxygen-containing medium in addition to the operating medium;
   at least the first gas generation unit is suitable for partial oxidation or for autothermal operation; and
   during the starting phase at most a quantity of operating medium or quantity of oxygen-containing medium which corresponds to the power $P_{start\_1}$ is supplied.

8. The method according to claim 7, wherein after the end of the starting phase, upon occurrence of a predetermined load rise, the first gas generation unit is supplied with oxygen-containing medium for a predetermined time.

9. The method according to claim 7, wherein after the end of the starting phase, the first gas generation unit is supplied with oxygen-containing medium only when a required power exceeds the rated power $P_{rated\_2}$ of the second gas generation unit.

10. The method according to claim 1, further comprising means for keeping the first gas generation unit warm during operational pauses.

11. The method according to claim 1, wherein the starting phase has ended as soon as the components of the fuel cell system through which the product gas stream of the first gas generation unit flows have reached a predetermined operating temperature.

12. The method according to claim 1, wherein:
    after the starting phase has ended, in the event of a low and medium load only the second gas generation unit is operated; and
    the first gas generation unit is operated only when a required power exceeds a rated power of the second gas generation unit is required.

13. A method of generating fuel gas for a fuel cell system, comprising:
    providing first and second gas generation units through which a reactant gas stream flows sequentially for generating said fuel gas, said first gas generation unit being upstream of said second gas generation unit, and having a thermal mass which is lower than a thermal mass of the second gas generation unit;
    during a startup operating phase, operating only the first gas generation unit, with at least one of a power greater than a rated power thereof and an operating temperature greater than a rated operating temperature thereof; and
    after completion of the startup operating phase, operating at least the second gas generation unit.

* * * * *